United States Patent
Herzog et al.

(10) Patent No.: US 9,419,681 B2
(45) Date of Patent: Aug. 16, 2016

(54) ELECTRICAL DEVICE FOR A POWERLINE SYSTEM FOR DATA TRANSMISSION AND POWERLINE SYSTEM FOR DATA TRANSMISSION

(71) Applicant: Bayerische Motoren Werke Aktiengesellschaft, Munich (DE)

(72) Inventors: Torsten Herzog, Munich (DE); Robert Weber, Schliersee (DE); Richard Bogenberger, Ebenhausen (DE); Winfried Siegl, Beilngries (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 622 days.

(21) Appl. No.: 13/866,287

(22) Filed: Apr. 19, 2013

(65) Prior Publication Data

US 2013/0230113 A1    Sep. 5, 2013

Related U.S. Application Data

(63) Continuation of application No. PCT/EP2011/068316, filed on Oct. 20, 2011.

(30) Foreign Application Priority Data

Oct. 20, 2010   (DE) .......................... 10 2010 042 720

(51) Int. Cl.
*B60L 11/18*   (2006.01)
*H04B 3/56*   (2006.01)
*H04B 3/54*   (2006.01)

(52) U.S. Cl.
CPC .............. *H04B 3/56* (2013.01); *B60L 11/1809* (2013.01); *H04B 3/548* (2013.01); *H04B 2203/547* (2013.01); *H04B 2203/5483* (2013.01)

(58) Field of Classification Search
CPC ............................ B60L 11/1809; H04B 3/548
See application file for complete search history.

(56) References Cited

U.S. PATENT DOCUMENTS

| | | | | |
|---|---|---|---|---|
| 6,255,935 B1* | 7/2001 | Lehmann | ................. | H04B 3/56 307/3 |
| 2007/0259644 A1* | 11/2007 | Chan | ........................ | H04B 3/54 455/402 |

(Continued)

FOREIGN PATENT DOCUMENTS

| | | |
|---|---|---|
| DE | 20 2005 007 632 U1 | 9/2005 |
| DE | 10 2006 014 621 A1 | 10/2007 |

(Continued)

OTHER PUBLICATIONS

International Preliminary Report on Patentability (PCT/IB/373) & Written Opinion (PCT/ISA/237) dated Apr. 23, 2012 (twelve (12) pages).

(Continued)

*Primary Examiner* — Jared Fureman
*Assistant Examiner* — Joel Barnett
(74) *Attorney, Agent, or Firm* — Crowell & Moring LLP

(57) ABSTRACT

An electrical device is provided for a power line system for data transmission, including at least one line of a power supply network, at least one signal line, and a coupling region wherein the at least one line of the power supply network and the at least one signal line are partially arranged. The at least one line of the power supply network and the at least one signal line are electrically isolated from each other and capacitively coupled to each other in the coupling region. A motor vehicle is equipped with the power line system for data transmission.

9 Claims, 1 Drawing Sheet

(56) References Cited

U.S. PATENT DOCUMENTS

| | | | |
|---|---|---|---|
| 2008/0190639 A1* | 8/2008 | Baran | H04B 3/56 174/50 |
| 2008/0316004 A1* | 12/2008 | Kiko | H04B 3/56 340/12.34 |

FOREIGN PATENT DOCUMENTS

| | | |
|---|---|---|
| DE | 10 2006 046 309 A1 | 4/2008 |
| DE | 10 2008 044 528 A1 | 3/2010 |
| EP | 0 987 810 A1 | 3/2000 |
| WO | WO 01/63787 A1 | 8/2001 |
| WO | WO 2004/062130 A1 | 7/2004 |

OTHER PUBLICATIONS

German Search Report dated Jun. 7, 2011 including partial English-language translation (Ten (10) pages).

International Search Report dated Apr. 4, 2012 including English-language translation (Eight (8) pages).

\* cited by examiner

ELECTRICAL DEVICE FOR A POWERLINE SYSTEM FOR DATA TRANSMISSION AND POWERLINE SYSTEM FOR DATA TRANSMISSION

CROSS REFERENCE TO RELATED APPLICATIONS

This application is a continuation of PCT International Application No. PCT/EP20111/068316, filed Oct. 20, 2011, which claims priority under 35 U.S.C. §119 from German Patent Application No. DE 10 2010 042 720.9, filed Oct. 20, 2010, the entire disclosures of which are herein expressly incorporated by reference.

BACKGROUND AND SUMMARY OF THE INVENTION

The invention relates to an electrical device for a power line system for data transmission, a power line system for data transmission, and a motor vehicle with a power line system for data transmission.

Power line systems for data transmission are used to transmit data over a power supply network. In a power line system for data transmission, an information signal can be applied to a present voltage signal. The information signal can be applied independently of the voltage and the frequency of the voltage signal. The data to be transmitted are typically modulated with a prespecified carrier frequency and are superimposed on the voltage signal of the power supply network. The information signal can be tapped, for example, at a suitable modem interface.

One problem, on which the invention is based, is to provide an electrical device for a power line system for data transmission and a power line system for data transmission that ensure a safe and reliable operation and are inexpensive to implement.

This problem is solved according to a first aspect of the invention by an electrical device for a power line system for data transmission, wherein the electrical device comprises at least one line of a power supply network, at least one signal line, and a coupling region, in which the at least one line of the power supply network and the at least one signal line are partially arranged. The at least one line of the power supply network and the at least one signal line are electrically isolated from one another and capacitively coupled to one another in the coupling region.

An electrical isolation and capacitive coupling of the at least one line of the power supply network and the at least one signal line have the advantage that the at least one line of the power supply network and the at least one signal line can have different voltage levels. In particular, the signal line can be designed as a low voltage line. Hence, the signal line can have small dimensions and, thus, a small mass. As a result, the space requirement for the signal line can be minimized. As a result, it is possible to achieve low costs for the signal line. Since the signal line is designed as a low voltage line, a high reliability of the electrical device can be achieved.

The electrical device can be installed advantageously in, for example, a motor vehicle, in particular, in a motor vehicle with a hybrid or electric drive. The line of the power supply network is designed preferably for carrying a charging current for charging a battery of a vehicle. In motor vehicles, in particular in hybrid or electric vehicles, the data transmission can be used, in particular, for the transmission of the operating parameters and/or the charging parameters. In particular, the power line system for data transmission can be used for the transmission of parameters for the state of charge (SOC) of a vehicle battery. The data to be transmitted are modulated with a prespecified carrier frequency and are superimposed on the voltage signal of the power supply network. The information signal can be tapped, for example, at a suitable modem interface.

In one advantageous embodiment, the at least one line of the power supply network and the at least one signal line are arranged at least partially parallel to one another in the coupling region. This arrangement has the advantage that the line of the power supply network and the signal line can be arranged with respect to one another in a simple way; and a good capacitive coupling between the line of the power supply network and the signal line can be achieved.

In another advantageous embodiment, the at least one line of the power supply network and the at least one signal line are at least partially twisted together in the coupling region. This arrangement has the advantage that the line of the power supply network and the signal line can be mechanically coupled to one another in a reliable way; and a good capacitive coupling between the line of the power supply network and the signal line can be achieved.

In an additional advantageous embodiment, the electrical device has a housing; and the coupling region is arranged inside the housing. The housing has an electric plug connector; and the electric plug connector is electrically coupled with the coupling region by way of the at least one signal line. This arrangement has the advantage that the electric plug connector for the signal line can be designed as a low voltage plug. Hence, the electric plug connector can have small dimensions and can be constructed cost effectively. Furthermore, safety measures for the low voltage plug can be minimized.

In another advantageous embodiment, the electrical device has a plug. The plug has a housing; and the coupling region is arranged inside the housing of the plug. This arrangement has the advantage that during the assembly of the plug, the electrical isolation and capacitive coupling of the two electrical lines can be provided at the same time and with little effort in a simple way.

In another advantageous embodiment, the electrical device has a socket. The socket has a housing; and the coupling region is arranged inside the housing of the socket. This arrangement has the advantage that during the assembly of the socket, the electrical isolation and capacitive coupling of the two electrical lines can be provided at the same time and with little effort in a simple way.

According to a second aspect, the invention is characterized by a power line system for data transmission, wherein the power line system comprises an electrical device, according to the first aspect of the invention.

The power line system for data transmission can be installed advantageously in, for example, a motor vehicle, in particular, in a motor vehicle with a hybrid drive or an electric drive.

In an advantageous embodiment according to the second aspect of the invention, the power line system has a modem. The at least one signal line is electrically coupled with the modem. Since the signal line can be designed as a low voltage line, the modem can be designed as a low voltage component. This feature makes it possible to design the modem with a minimum space requirement. Therefore, the modem can be constructed cost effectively.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
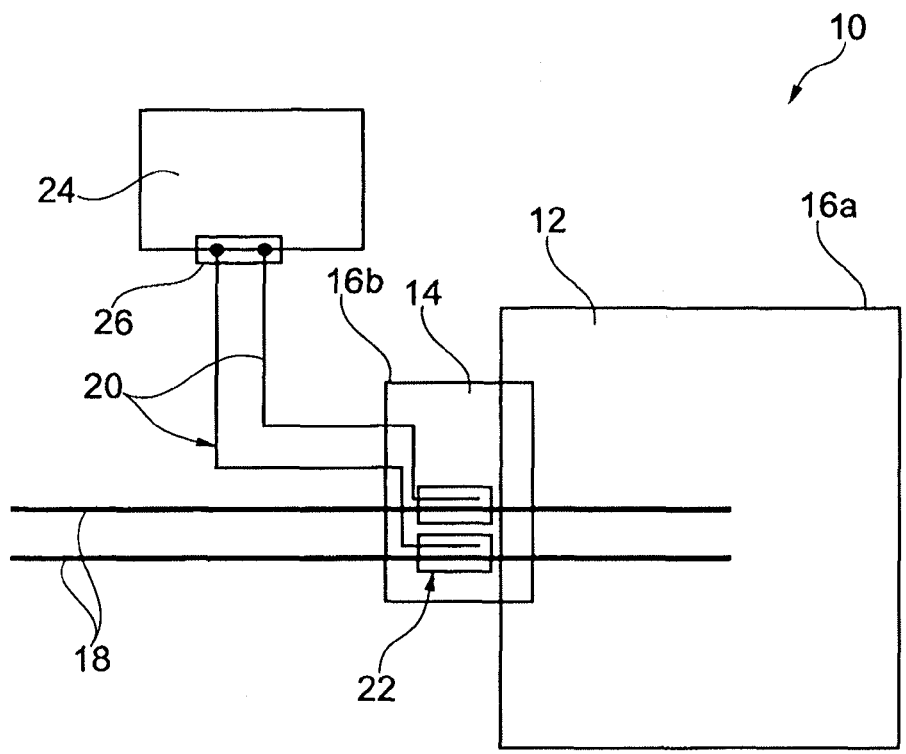
FIG. 1 is a schematic view of a power line system for data transmission in a first embodiment.

Elements of identical construction or function are provided with the same reference numerals in all of the drawing figures.

The figures show in each instance a power line system 10 for data transmission. The power line system 10 for data transmission has one or more electrical devices. The power line system 10 for data transmission has one electrical component 12. The electrical component 12 has a housing 16a. The power line system 10 for data transmission in FIG. 1 has a plug 14. The plug 14 has an additional housing 16b.

In addition, the power line system 10 for data transmission has two lines 18 of a power supply network and two signal lines 20. In additional embodiments the power line system 10 for data transmission can also have just one line 18 of the power supply network and only one signal line 20, respectively. The power line system 10 for data transmission can also have more than two lines 18 of the power supply network and more than two signal lines 20, respectively.

In the embodiment shown in FIG. 1, the lines 18 of the power supply network and the signal lines 20 are arranged partially in the housing 16b of the plug 14. The lines 18 of the power supply network and the signal lines 20 are electrically isolated from one another. Two coupling regions 22 are formed inside the housing 16b of the plug 14; and in these two coupling regions the lines 18 of the power supply network and the signal lines 20 are capacitively coupled with one another. In particular, one of the lines 18 of the power supply network is capacitively coupled with one of the signal lines 20; and another one of the lines 18 of the power supply network is capacitively coupled with another one of the signal lines 20. Inside the housing 16b of the plug 14, one of the lines 18 of the power supply network is arranged in parallel to one of the signal lines 20 in the coupling regions 22.

In additional embodiments of the plug 14, one of the lines 18 of the power supply network is twisted with one of the signal lines 20 in the coupling regions 22. As a result of this arrangement, a mechanically very reliable connection between the line 18 of the power supply network and the signal line 20 can be achieved.

Furthermore, the power line system 10 for data transmission has a modem 24. The modem 24 is designed for the purpose of coupling out and/or coupling in and modulating and/or demodulating the data that are transmitted over the lines 18 of the power supply network and the signal lines 20. The power line system 10 for data transmission includes an electric plug connector 26 that is arranged preferably at the modem 24. The signal lines 20 are electrically coupled with the modem 24 by use of the electric plug connector 26.

Figure 2:
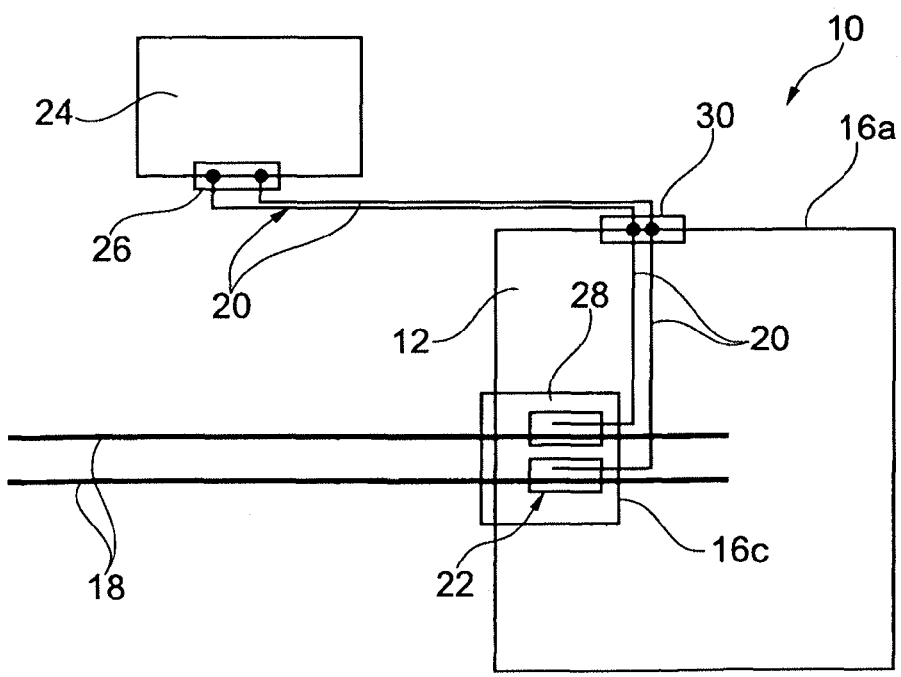
FIG. 2 is a schematic view of the power line system for data transmission in an additional embodiment.

FIG. 2 shows an embodiment of the power line system 10 for data transmission, wherein the power line system has a socket 28. The socket 28 is designed as a device socket and is disposed in the housing 16a of the electrical component 12. The socket 28 has an additional housing 16c, in which the two lines 18 of the power supply network and the two signal lines 20 are partially arranged. The two coupling regions 22 are formed inside the housing 16c of the socket 28. In these two coupling regions one of the lines 18 of the power supply network is capacitively coupled with one of the signal lines 20 respectively.

An electric plug connector 30 is arranged on the housing 16a of the electrical component 12. The electric plug connector 30 is electrically coupled with the coupling regions 22 by way of the signal lines 20. The signal lines 20 extend from the electric plug connector 30 of the electrical component 12 to the electric plug connector 26 of the modem 24. As a result, the coupling regions 22 are electrically coupled with the modem 24 in a simple way.

The electrical isolation and capacitive coupling of one of the lines 18 of the power supply network with one of the signal lines 20 makes it possible for the signal lines 20 to lie on a lower voltage level than the lines 18 of the power supply network. As a result, the signal lines 20 can be constructed small and have a small mass. Furthermore, the installation space for the signal lines 20 can be small. Moreover, the costs for the signal lines 20 can be low. An additional advantage of the power line system 10 for data transmission consists of the fact that due to the low voltage level at the signal lines 20, a high safety of the power line system 10 for data transmission can be achieved. In addition to and beyond this feature, the electric plug connector 26 of the modem 24 can be designed as a low voltage component. As a result, the electric plug connector 26 of the modem 24 can have a minimum space requirement. Furthermore, the costs for the electric plug connector 26 of the modem 24 can be minimized.

FIG. 2 shows an embodiment of the power line system 10 for data transmission, wherein said power line system has, in particular, the advantage that the electric plug connector 30 in the housing 16a of the electrical component 12 can be designed as a low voltage plug and can be used for the transmission of additional signals. Consequently, the electric plug connector 26 can also be constructed at a reasonable cost. Furthermore, the signal line 20 between the electric plug connector 30 in the housing 16a and the electric plug connector 26 of the modem 24 can be designed as a low voltage component and can have a minimum space requirement.

Preferably, the power line system 10 for data transmission is configured for a hybrid or electric vehicle. If the power line system 10 for data transmission is designed for a hybrid or electric vehicle, then the lines 18 are designed preferably for carrying charging current. The lines 18 that are designed for carrying the charging current are electrically coupled preferably with a vehicle battery (not illustrated). Furthermore, in this case the electrical isolation and the capacitive coupling of the lines 18, 20 make it possible to operate the lines 18 that are designed for carrying the charging current with, for example, a voltage of 110 to 600 volts, whereas the signal lines 20 can be operated, for example, at a voltage level of 12 V, 24 V or 36 V. Since the size of the installation space and the weight of the components in hybrid or electric vehicles are very important factors, the advantages of a low weight and a minimum space requirement of the signal lines 20 in the power line systems 10, which are intended for data transmission and are designed for hybrid or electric vehicles, can have a very positive effect.

The function of the power line system 10 for data transmission shall be briefly described in the following.

In a first operating case, the modem 24 can serve preferably to couple data into the power line system 10 for data transmission. For this purpose the modem 24 can be coupled, for example, with measuring sensors for the acquisition of measurement data. The detected measurement signals are transmitted from the measuring sensors to the modem 24. At this point the measurement signals are modulated, if desired, by means of the modem 24. The resulting signals are transmitted to the signal lines 20 by way of the electric plug connector 26 of the modem 24, and finally travel, if desired, by way of the electric plug connector 30 of the electrical component 12, to the coupling region 22. In the coupling region 22 the signals are transmitted from the signal lines 20 to the lines 18 of the power supply network by way of the capacitive coupling.

In a second operating case, the modem 24 can serve preferably to couple data out of the power line system 10 for data transmission. In the coupling region 22, the signals are transmitted from the signal lines 18 of the power supply network to the signal lines 20 by means of the capacitive coupling. Then, the signals travel, if desired, by way of the electric plug connector 30 of the electrical component 12, by way of the electric plug connector 26 of the modem 24 to the modem 24. At this point the signals are demodulated, if desired, by the modem 24 and can then be transmitted from the modem 24 to a suitable detection and/or evaluation device (not shown).

LIST OF REFERENCE NUMERALS

- 10 power line system
- 12 electrical component
- 14 plug
- 16a, 16b, 16c housing
- 18 line of a power supply network
- 20 signal line
- 22 coupling region
- 24 modem
- 26 electric plug connector of 24
- 28 socket
- 30 electric plug connector of 12

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electrical device for a power line data transmission system, said electrical device comprising:
   at least one line of a power supply network;
   at least one signal line configured to provide a data portion of a data-over-power signal; and
   a coupling region, in which the at least one line of the power supply network and the at least one signal line are partially arranged;
   wherein the at least one line of the power supply network and the at least one signal line are electrically isolated from one another and capacitively coupled to one another in the coupling region, and
   wherein the at least one line of the power supply network and the at least one signal line are at least partially twisted together in the coupling region.

2. The electrical device according to claim 1, wherein:
   the electrical device has a housing;
   the coupling region is arranged inside the housing;
   the housing has an electric plug connector; and
   the electric plug connector is electrically coupled with the coupling region by way of the at least one signal line.

3. The electrical device according to claim 1, wherein:
   the electrical device has a housing;
   the coupling region is arranged inside the housing;
   the housing has an electric plug connector; and
   the electric plug connector is electrically coupled with the coupling region by way of the at least one signal line.

4. The electrical device according to claim 1, wherein:
   the electrical device has a plug;
   the plug has a housing; and
   the coupling region is arranged inside the housing of the plug.

5. The electrical device according to claim 1, wherein:
   the electrical device has a plug;
   the plug has a housing; and
   the coupling region is arranged inside the housing of the plug.

6. The electrical device according to claim 1, wherein:
   the electrical device has a socket;
   the socket has a housing; and
   the coupling region is arranged inside the housing of the socket.

7. The electrical device according to claim 1, wherein:
   the electrical device has a socket;
   the socket has a housing; and
   the coupling region is arranged inside the housing of the socket.

8. A power line system for data transmission, said power line system comprising:
   an electrical device, the electrical device comprising:
      at least one line of a power supply network;
      at least one signal line configured to provide a data portion of a data-over-power signal; and
      a coupling region, in which the at least one line of the power supply network and the at least one signal line are partially arranged;
   wherein the at least one line of the power supply network and the at least one signal line are electrically isolated from one another and capacitively coupled to one another in the coupling region, and
   wherein the at least one line of the power supply network and the at least one signal line are at least partially twisted together in the coupling region.

9. The power line system according to claim 8, said power line system further comprising a modem, wherein the at least one signal line is electrically coupled with the modem.

* * * * *